(12) United States Patent
Price et al.

(10) Patent No.: US 10,475,147 B2
(45) Date of Patent: Nov. 12, 2019

(54) MULTIPLE GPU GRAPHICS PROCESSING SYSTEM

(71) Applicant: Arm Limited, Cambridge (GB)

(72) Inventors: Steven John Price, Cambridge (GB); Hakan Lars-Goran Persson, Bjarred (SE); Ian Victor Devereux, Cambridge (GB); Jussi Tuomas Pennala, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/428,645

(22) Filed: Feb. 9, 2017

(65) Prior Publication Data

US 2017/0236244 A1  Aug. 17, 2017

(30) Foreign Application Priority Data

Feb. 12, 2016 (GB) .................................... 1602547

(51) Int. Cl.
*G06T 1/20* (2006.01)
*G06T 1/60* (2006.01)
*G06F 9/50* (2006.01)

(52) U.S. Cl.
CPC ............. *G06T 1/20* (2013.01); *G06F 9/5066* (2013.01); *G06T 1/60* (2013.01)

(58) Field of Classification Search
None
See application file for complete search history.

(56) References Cited

U.S. PATENT DOCUMENTS

| 7,598,958 | B1  | 10/2009 | Kelleher |              |
|-----------|-----|---------|----------|--------------|
| 7,633,505 | B1* | 12/2009 | Kelleher | G06T 1/20    |
|           |     |         |          | 345/502      |
| 7,721,118 | B1* | 5/2010  | Tamasi   | G06F 1/3203  |
|           |     |         |          | 713/300      |
| 2003/0164834 | A1 | 9/2003 | Lefebvre |             |
| 2005/0041031 | A1* | 2/2005 | Diard   | G06T 15/005  |
|           |     |         |          | 345/505      |

(Continued)

FOREIGN PATENT DOCUMENTS

GB  2527822  1/2016

OTHER PUBLICATIONS

GB Combined Search and Examination Report, dated Jul. 21, 2016, GB Patent Application No. GB1602547.0.
U.S. Appl. No. 16/047,336, filed Jul. 27, 2018.

*Primary Examiner* — Jason A Pringle-Parker
(74) *Attorney, Agent, or Firm* — Vierra Magen Marcus LLP

(57) ABSTRACT

A graphics processing system comprises a pair of graphics processing units that are connected to each other via communications bridges that can allow communication between the connected graphics processing units. One of the graphics processing units is operable to act as a master graphics processing unit controlling graphics processing operations on the other graphics processing unit which is operable as a slave graphics processing unit to perform graphics processing operations under the control of the master graphics processing unit. Each graphics processing unit of the pair of graphics processing units is also capable of operating in a standalone mode, in which the graphics processing unit operates independently of the other graphics processing unit to perform a graphics processing task.

19 Claims, 8 Drawing Sheets

(56) References Cited

U.S. PATENT DOCUMENTS

2006/0267987 A1 11/2006 Litchmanov
2008/0098208 A1* 4/2008 Reid .................... G06F 11/362
  712/234
2012/0249559 A1* 10/2012 Khodorkovsky ..... G06F 1/3203
  345/502
2014/0218377 A1 8/2014 Wu

* cited by examiner

MULTIPLE GPU GRAPHICS PROCESSING SYSTEM

BACKGROUND

The technology described herein relates to graphics processing systems, and in particular to graphics processing systems that comprise plural graphics processing units (graphics processors).

It is becoming increasingly common for data processing systems to require multiple, independent graphics processing operations. For example, electronic instrument panels in cars may have an LCD for the main instrument console, a HUD projected in the windscreen, and an additional navigation/entertainment screen. Each of these displays will require their own graphics processing operations (and it may be necessary, e.g. for formal safety requirements, for them to be able to operate independently of each other).

One approach to such systems would be to provide a single graphics processing unit (GPU) that is time shared between the different graphics processing functions that are required. However, such time sharing can be complex and error prone, and may not be able to provide fully independent execution of the different graphics processing functions.

Alternatively, a separate graphics processing unit could be provided for each graphics processing function that is required. However, this has implications in terms, e.g., of cost.

The Applicants believe that there remains scope for improvements to graphics processing systems where the provision of graphics processing functions for, e.g. plural different displays, is required.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
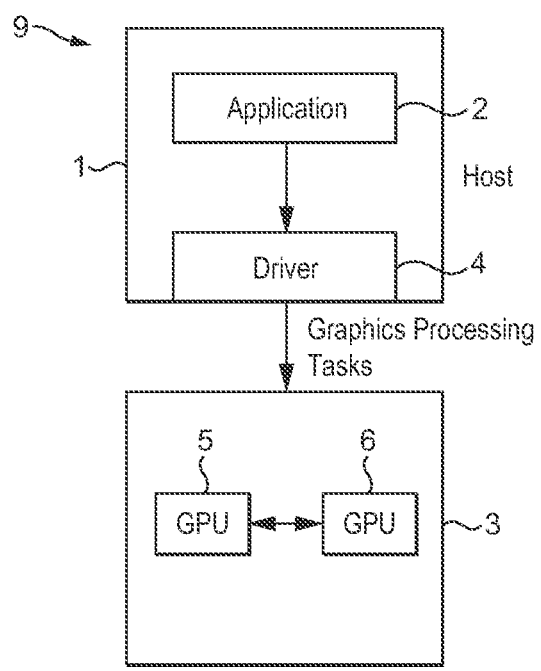
FIG. 1 shows a data processing system that is in accordance with an embodiment of the technology described herein.

A first embodiment of the technology described herein comprises a graphics processing system comprising a plurality of graphics processing units, wherein:

each graphics processing unit of the plurality of graphics processing units is connected to at least one other graphics processing unit of the plurality of graphics processing units via a communications bridge that can allow communication between the connected graphics processing units; and at least one of the graphics processing units of the plurality of graphics processing units is operable to act as a master graphics processing unit controlling graphics processing operations on another one or ones of the graphics processing units of the plurality of graphics processing units; and at least one of the graphics processing units of the plurality of graphics processing units is operable as a slave graphics processing unit to perform graphics processing operations under the control of a master graphics processing unit of the plurality of graphics processing units.

A second embodiment of the technology described herein comprises a method of operating a graphics processing system comprising a plurality of graphics processing units, in which each graphics processing unit of the plurality of graphics processing units is connected to at least one other graphics processing unit of the plurality of graphics processing units via a communications bridge that can allow communication between the connected graphics processing units;

the method comprising:

enabling communication between at least two of the graphics processing units of the plurality of graphics processing units via a communications bridge or bridges of the graphics processing units to allow communication between the at least two graphics processing units;

and one of the graphics processing units of the at least two graphics processing units acting as a master graphics processing unit controlling graphics processing operations on the other one or ones of the at least two graphics processing units of the plurality of graphics processing units with which it can communicate; and the other one or ones of the at least two graphics processing units acting as a slave graphics processing unit or units to perform graphics processing operations under the control of the graphics processing unit that is acting as a master graphics processing unit.

The technology described herein relates to a graphics processing system that includes plural graphics processing units. However, in the technology described herein, the plural graphics processing units are connected to each other via communication bridges such that they can communicate with each other. Furthermore, at least one of the plural graphics processing units is able to operate as a master graphics processing unit controlling graphics processing operations on the other graphics processing units of the graphics processing system.

This arrangement then provides a graphics processing system that includes plural graphics processing units that can each be operated independently, as standalone graphics processing units, but with the graphics processing units also being able to be operated in a combined manner with one of the graphics processing units controlling operations of other ones of the graphics processing units (that thereby act as "slave" graphics processing units).

As will be discussed further below, the effect of this then is that the graphics processing system can be operated (e.g. from the perspective of an application processor that requires graphics processing operations) either as multiple separate graphics processing units, e.g. to execute multiple different graphics processing functions, or with some or all of the graphics processing units "linked" together to execute fewer (or a single) graphics processing function or task e.g., and in an embodiment, with higher performance (since there will be multiple linked graphics processing units able to execute the function or task in question).

In other words, the plurality of graphics processing units of the graphics processing system of the technology described herein can be, in effect, configured and used as multiple discrete graphics processing units, or, e.g., as a larger (e.g. single) graphics processing unit that comprises plural ones of the individual graphics processing units of the plurality of graphics processing units.

This then provides additional functionality and flexibility for providing a graphics processing system that can be operable to perform a plurality of different functions and at varying levels of performance (as, e.g., using plural ones of the graphics processing units in combination can facilitate higher performance compared with one of the graphics processing units of the plurality of graphics processing units acting alone).

The graphics processing system of the technology described herein can comprise any desired number of plural graphics processing units. In an embodiment there are two graphics processing units. In another embodiment there are four graphics processing units.

The graphics processing units of the graphics processing system can comprise any suitable and desired form of graphics processing units. In an embodiment the graphics processing units (and thus the graphics processing system) are tile-based graphics processing units.

The graphics processing units of the graphics processing system of the technology described herein can and in an embodiment do comprise any or all of the normal components, functional units, and elements, etc., that a graphics processing unit may comprise. In an embodiment each graphics processing unit of the plurality of graphics processing units has the same set of functional units, etc., although this is not essential.

In an embodiment each graphics processing unit of the plurality of graphics processing units includes one or more execution units, such as, and in an embodiment, shader (programmable processing) cores. Where the graphics processing units are tile-based graphics processing units, then each graphics processing unit also in an embodiment includes an appropriate tiling unit (a tiler). Different graphics processing units of the plurality of graphics processing units may have different sets of execution units, and they may have other execution units in addition to shader cores and tiling units. In an embodiment a (and in an embodiment each) graphics processing unit includes a plurality of shader cores, such as four shader cores (programmable processing (shader) cores).

A graphics processing unit (and in an embodiment each graphics processing unit) of the plurality of graphics processing units in an embodiment also comprises a management unit (a job manager) that provides the host (software) interface for the graphics processing unit and is also operable to partition a graphics processing task allocated to the graphics processing unit into subtasks and to distribute the subtasks for execution to the execution unit or units of the graphics processing unit.

A graphics processing unit and in an embodiment each graphics processing unit in an embodiment also comprises a cache (and in an embodiment a level 2 cache) that provides the interface to an external (main) memory system of the overall data processing system that the graphics processing system is part of. This cache can be arranged in any suitable and desired manner.

A graphics processing unit or each graphics processing unit may also include a memory management unit (MMU) (although this is not essential and appropriate memory management units could also be located externally to the graphics processing unit or units, if desired).

Each graphics processing unit in an embodiment also comprises an appropriate communications network for providing communications between the various units of the graphics processing unit, such as memory transactions between execution units and the cache of the graphics processing unit, subtask control traffic between the job manager and execution units and so on.

This communications network can be provided as desired, but in an embodiment is provided as a, in an embodiment message based, interconnect using switches. As will be discussed further below, the routing of the communications network (the interconnect) can in an embodiment be reconfigured in use, depending upon which operation mode (master, slave or standalone) the graphics processing unit is operating in. This is in an embodiment done by appropriately configuring the switches in the communication network.

As discussed above, each graphics processing unit of the plurality of graphics processing units will include a communications bridge for connecting the graphics processing unit to another one of the graphics processing units of the plurality of graphics processing units. Each graphics processing unit may be connected via a bridge to only one other graphics processing unit, or it could be connected to plural other graphics processing units, e.g. depending upon the configuration and layout of the graphics processing units and how many graphics processing units there are in the graphics processing system.

In an embodiment there is a separate bridge for each other graphics processing unit that the graphics processing unit in question is connected to. Thus, for example, where a graphics processing unit is connected to two other graphics processing units of the plurality of graphics processing units, then that graphics processing unit will have two communications bridges, with each communications bridge connecting the graphics processing unit to a respective other graphics processing unit of the plurality of graphics processing units.

In an embodiment, a graphics processing unit is connected either to one or to two other graphics processing units. In the case where there are only two graphics processing units in the plurality of graphics processing units, then each graphics processing unit will be connected to one other graphics processing unit. Where there are more than two graphics processing units in the plurality of graphics processing units, then in an embodiment some of the graphics processing units in the plurality of graphics processing units are connected to one other graphics processing unit, and others of the graphics processing units are connected to two other graphics processing units of the plurality of graphics processing units.

Thus, in an embodiment, a graphics processing unit can be connected to a maximum of two other graphics processing units (and accordingly may have two but no more than two connection bridges).

Other arrangements would, of course, be possible.

Each communications bridge in an embodiment allows direct communication between the two graphics processing units that the bridge connects.

The respective bridges of the graphics processing units are in an embodiment configurable in use to either allow or prevent communication with another graphics processing unit via the bridge. This can be achieved in any desired and suitable manner. In an embodiment the graphics processing units include appropriate switches (e.g. the switches of the communications network discussed above) that can be set to allow or prevent communication via the communications bridge.

The bridges connecting the graphics processing units in an embodiment provide and support an asynchronous interface between the graphics processing units. This facilitates physical implementation of the graphics processing units, as the clock for each graphics processing unit may then be independent even when the graphics processing units are communicating via their bridges.

In an embodiment, where a graphics processing unit has two connection bridges, then in an embodiment the connection bridges are aligned in the layout of the graphics processing unit, so that that graphics processing unit can straightforwardly be instantiated multiple times in an integrated circuit. This will then facilitate more straightforward manufacture of the graphics processing system, as it would be possible to form the graphics processing system of linked graphics processing units simply by instantiating such a "standard" graphics processing unit design multiple times in an integrated circuit.

Each graphics processing unit of the plurality of graphics processing units is in an embodiment capable of operating in a "standalone" mode. Thus, in an embodiment, all of the graphics processing units of the plurality of graphics processing units are capable of operating in a standalone mode.

In this mode, the graphics processing unit will operate on its own (not in combination with any of the other graphics processing units) to perform a desired graphics processing task (operation), such as providing an output frame(s) for display, and in an embodiment operates independently of the other graphics processing units, in an embodiment under direct control from software (e.g., and in an embodiment, under the control of an appropriate driver for the graphics processing unit that is executing on a host processor of the overall data processing system that the graphics processing system is part of).

Thus, in an embodiment, the method of the technology described herein further comprises (and the system is configured to): disabling communication via a communications bridge or bridges between a graphics processing unit of the plurality of graphics processing units and the graphics processing unit or units to which it is connected via its communication bridges; and operating that graphics processing unit in a standalone mode, in which the graphics processing unit operates independently of the other graphics processing units to perform a graphics processing task.

Correspondingly, a further embodiment of the technology described herein provides a method of operating a graphics processing system comprising a plurality of graphics processing units, in which each graphics processing unit of the plurality of graphics processing units is connected to at least one other graphics processing unit of the plurality of graphics processing units via a communications bridge that can allow communication between the connected graphics processing units;

the method comprising:

disabling communication via a communications bridge or bridges between a graphics processing unit of the plurality of graphics processing units and the graphics processing unit or units to which it is connected via its communication bridges; and operating that graphics processing unit in a standalone mode, in which the graphics processing unit operates independently of the other graphics processing units to perform a graphics processing task.

When operating in standalone mode, a graphics processing unit in an embodiment does not have any internal dependencies on any of the other graphics processing units. Thus, each graphics processing unit in an embodiment has a separate clock and reset, so that there should be no internal dependencies on any of the other graphics processing units of the plurality of graphics processing units when operating in the standalone mode.

In this mode of operation, a job manager unit that provides the software interface for the graphics processing unit in question in an embodiment partitions the graphics processing task of the graphics processing unit into subtasks and distributes the subtasks for execution to the various execution units of the graphics processing unit.

Each graphics processing unit of the plurality of graphics processing units should also be, and is in an embodiment also, capable of operating in at least one of a master mode and a slave mode. A graphics processing unit may be "hard wired" to be operable only as a master graphics processing unit or a slave graphics processing unit (in addition to being operable as a standalone graphics processing unit), or it may be configured to be capable of operating both as a master graphics processing unit and as a slave graphics processing unit (in addition to as a standalone graphics processing unit), with the master or slave operation then being able to be set in use, e.g., and in an embodiment, by appropriate configuration of the graphics processing unit using, e.g., software, in use. For example, software executing on a host processor (e.g. and in an embodiment a driver for the graphics processing unit or graphics processing system) could operate to set control registers to configure a graphics processing unit to operate in the master or slave or standalone mode, as desired.

In the master mode operation, the graphics processing unit will operate to control other graphics processing units operating in slave mode, and in the slave mode the graphics processing unit will operate under the control of another one of the plurality of graphics processing units that is acting as a master graphics processing unit.

A graphics processing unit may be operable in two different modes only (e.g. standalone mode or master mode, or in standalone mode or slave mode), or may be able to be operated in each of the three modes (i.e. the standalone mode, master mode or slave mode), e.g., and in an embodiment, depending upon the layout of the graphics processing units and how many graphics processing units there are in the graphics processing system.

A graphics processing unit can be configured to operate in the desired mode in any suitable and desired manner. In an embodiment this is achieved by appropriately setting the communication network of the graphics processing unit to allow communication relevant to the operating mode in question (and to prevent communication that would be appropriate for another operating mode). Thus, for example, where the graphics processing unit is to act in standalone mode, the communication to other graphics processing units via the communications bridge or bridges of the graphics processing unit is in an embodiment disabled (prevented). Correspondingly, where the graphics processing unit is to act as a master or slave graphics processing unit, then in an embodiment the communication network (links) between the communication bridges of the graphics processing unit and its corresponding slave or master graphics processing units is configured accordingly.

This is in an embodiment done by setting switches controlling the communication network and communication links via the bridges to other graphics processing units of the plurality of graphics processing units appropriately.

The desired routing configuration can be set (configured) in any suitable and desired manner. In an embodiment this can only be reconfigured through external logic control that is external to the graphics processing unit (i.e. such that any application controlling the graphics processing unit to perform graphics processing tasks cannot itself operate to set the configuration of the graphics processing unit). This may be beneficial for security purposes.

In an embodiment the communication network (routing) configuration can be performed by setting that control configuration via external register interfaces to the graphics processing units. In an embodiment the configuration of the bridges is set in a separate register block to the standard job manager (management unit) registers of the graphics processing unit. This would then allow, e.g., a hypervisor to provide access to the management unit (job manager) registers of the graphics processing unit to a guest without allowing the guest to reconfigure the communication bridges and the communication network routing. (However, this may not be essential or used in all designs, and the communication network setup could instead be handled by the same driver that operates the management unit (job manager) of the graphics processing unit, if desired.)

It is also in an embodiment the case that any communications network reconfiguration of a graphics processing unit is only able to happen, and only happens, during reset of the graphics processing unit.

When a graphics processing unit is operating in the master mode of operation, it will control at least one other graphics processing unit of the plurality of graphics processing units operating in slave mode. The master GPU in an embodiment provides the software interface for itself and its set of slave GPUs. This then has the advantage that to any external application and driver that is using the graphics processing system, it still appears as though there is only a single graphics processing unit.

Where a graphics processing unit is operating as a master graphics processing unit, then it will be, and is in an embodiment, directly connected to at least one slave graphics processing unit of the plurality of graphics processing units via the appropriate communications bridge. It may also control further slave graphics processing units of the plurality of graphics processing units. In this case, the master graphics processing unit may have a direct connection with each of the plural slave graphics processing units via appropriate communications bridges, but in an embodiment a master graphics processing unit can control and communicate with plural slave graphics processing units via respective other slave graphics processing units (such that the master GPU may control and communicate with one or more slave GPUs via a "daisy-chain" of other slave GPUs).

A graphics processing unit operating in the master mode may control only a single slave graphics processing unit, or may control plural slave graphics processing units (e.g. depending upon how many graphics processing units are present in the graphics processing system). Where the graphics processing system includes three or more graphics processing units, then in an embodiment the graphics processing unit operating in master mode can control plural other graphics processing units of the set of graphics processing units (and in an embodiment, if desired, all of the other graphics processing units of the set of graphics processing units).

It will be appreciated that when one of the graphics processing units is acting as a master graphics processing unit, there will correspondingly be one or more other graphics processing units of the plurality of graphics processing units that are in communication with that master graphics processing unit and acting as slave graphics processing units under the control of that master graphics processing unit. Thus, there will, in effect, be a linked set of graphics processing units comprising one graphics processing unit acting as a master graphics processing unit for the linked set of graphics processing units and one or more other graphics processing units acting as slave graphics processing units in the linked set of graphics processing units. The linked set of graphics processing units may comprise two or more graphics processing units of the plurality of graphics processing units. It may comprise all of the graphics processing units of the plurality of graphics processing units that the graphics processing system comprises, or only a subset of that plurality of graphics processing units. In an embodiment, a given linked set of graphics processing units comprises two graphics processing units (i.e. one master and one slave graphics processing unit), or four graphics processing units.

When operating in the slave mode, a graphics processing unit will operate under the control of another graphics processing unit of the plurality of graphics processing units that is acting as a master graphics processing unit. In this case, the slave graphics processing unit may communicate with its respective master graphics processing unit directly where the master graphics processing is directly connected via a communications bridge to the slave graphics processing unit, or it may communicate with the master graphics processing unit via one or more other (slave) graphics processing units in a daisy-chain type arrangement, if desired.

When a graphics processing unit is operating in standalone mode (i.e. operating independently of the other graphics processing units of the plurality of graphics processing units), then the graphics processing unit should, and in an embodiment does, operate in the normal manner for the type of graphics processing unit in question. Thus, for example, the job manager of the graphics processing unit will receive graphics processing tasks, e.g., and in an embodiment, from a driver executing on a host processor of the data processing system that the graphics processing system is part of, and then partition that task into subtasks and distribute the subtasks for execution to the various execution units of the graphics processing unit.

When a graphics processing unit of the plurality of graphics processing units is to operate in either master mode or slave mode, then the operation of the graphics processing unit can be, and is in an embodiment, modified from its operation when operating in standalone mode, e.g., and in an embodiment, to take account of the fact that the graphics processing unit is acting as a master or as a slave, respectively.

In an embodiment, when a graphics processing unit is operating in master mode (as a master graphics processor controlling other graphics processing units of the plurality of graphics processing units operating in slave mode), the master graphics processing unit acts as and provides the host (software) interface for the set of graphics processing units that it is acting as a master graphics processing unit for (i.e. for the linked set of graphics processing units comprising the master graphics processing unit and its associated slave graphics processing units).

Thus, in an embodiment, when a graphics processing unit is acting as a master graphics processing unit, the job manager for that master graphics processing unit provides the software interface for the linked set of master and its respective slave graphics processing units, and so all communication between the, e.g. driver, on the host processor that allocates graphics processing tasks to the linked set of graphics processing units in an embodiment takes place via the job manager of the master graphics processing unit (i.e. there is no direct communication between the driver and the slave graphics processing units of the linked set of graphics processing units).

Correspondingly, in an embodiment the master graphics processing unit, and in an embodiment the job manager of the master graphics processing unit, is operable to partition any graphics processing task allocated to the linked set of graphics processing units into subtasks and to distribute those subtasks for execution to execution units not only of the master graphics processing unit but also to execution units of one or more of, and in an embodiment plural of, and in an embodiment all of, the slave graphics processing units that are linked to the master graphics processing unit. This then allows the master graphics processing unit to, in effect, distribute graphics processing task processing across the slave graphics processing units that it is controlling, but the arrangement is such that from the host processor (application) side, there is still only a single graphics processing unit that is being instructed and to which the graphics processing task is being sent.

The job manager of a master graphics processing unit may, e.g., be, and is in an embodiment, configured so as to be able to "see" the execution units of its "slave" graphics processing units, when it is to act as a master graphics processing unit.

The, e.g., job manager, of a graphics processing unit may be operable to distribute subtasks to and communicate with the execution units (and other functional units) of the graphics processing unit (and of any other graphics processing units that it is acting as a master for) in any suitable and desired manner. In an embodiment, this is done using a suitable addressing arrangement that allows communications to and from the different execution units, etc., to be appropriately indicated and identified.

In an embodiment, a communications network topology dependent addressing arrangement is used for communications between the functional units of the graphics processing units. In an embodiment an addressing arrangement in which the functional units of the graphics processing units are considered to be arranged on an (X, Y) grid, with respective functional units then being addressed by their appropriate X, Y coordinate on the grid, is used for communications between the functional units of the graphics processing units.

A message to be sent to a functional unit in an embodiment then includes with it the address of the target (destination) functional unit in terms of the X, Y coordinate where the target functional unit is located. In an embodiment, messages are passed to the switches of the communications networks of the graphics processing units of the graphics processing system in sequence, with each switch comparing the target coordinate address to its X, Y coordinate (to the X, Y coordinate of the functional unit that the switch in question is associated with), and then forwarding the message to an adjacent switch, or to its associated functional unit, accordingly.

In an embodiment, each functional unit also has a in an embodiment unique (at least for the current configuration of the graphics processing units) system address (that is in an embodiment not network topology dependent). In an embodiment, this address is used to identify a target functional unit, and then converted to the "network topology", e.g. X, Y coordinate, address for sending the message. This conversion can be done, e.g., and in an embodiment using a, in an embodiment predefined, set of address mappings between the "system" addresses and "network" addresses (e.g., and in an embodiment, in a look up table).

In an embodiment, the "system" addresses of the functional units can be (re-) configured in use, e.g., and in an embodiment, depending on whether a graphics processing unit is operating in stand alone mode or as a master or as a slave. Correspondingly, the "network" addresses (and/or their mappings to "system" addresses) can in an embodiment be (re-) configured in use.

Other arrangements for the addressing would, of course, be possible.

In an embodiment, the addressing arrangement for the graphics processing units and for the execution, etc., units of the graphics processing units is configured to facilitate the operation of graphics processing units both in standalone mode and as a master graphics processing unit. For example, there may be different address maps used depending upon whether a graphics processing unit is operating in standalone mode or is operating as a master graphics processing unit for a linked set of a master and one or more slave graphics processing units (and in one embodiment this is the case).

Correspondingly, the addressing arrangement is in an embodiment configured to facilitate the operation of a graphics processing unit as a master graphics processing unit. For example, when a graphics processing unit is to operate as a master graphics processing unit, then it could use a different address space (its job manager could use a different address space) for addressing its execution units and the execution units of its linked slave execution units, than when the graphics processing unit is operating in a standalone mode. Alternatively or additionally, the address map used by (the job manager of) a master graphics processing unit could be expanded from the address map that is used when that graphics processing unit is acting in a standalone mode, when the graphics processing unit is to act as a master graphics processing unit.

If the execution units (e.g. shader cores), etc., of each graphics processing unit of the graphics processing system each use a different address, then a master graphics processing unit could simply use those different addresses to address the execution units of slave graphics processing units. On the other hand, if the same addresses are used for the execution units for each graphics processing unit when operating in standalone mode, then the address mapping for the execution units of the graphics processing units should be, and is in an embodiment, reconfigured when the graphics processing units are to be used as a linked set of a master and one or more slave graphics processing units.

In an embodiment, each graphics processing unit instance has a unique set of functional (execution) unit IDs (e.g. processing core IDs). When operating in standalone mode, the, e.g. job manager, of the graphics processing unit is in an embodiment configured to be able to see the set of execution units of the graphics processing unit (which may not be numbered from zero). Then, when a graphics processing unit is operating as a master graphics processing unit, the job manager of that master graphics processing unit is in an embodiment able to see more execution units, but the execution unit IDs will not overlap.

The, e.g., job managers may, e.g., and in an embodiment, have a discovery mechanism to identify which execution units are available for their current mode of operation (and in one embodiment this is what is done), or, e.g., the, e.g. job manager of, the master graphics processing unit could be informed which execution units, etc., are in its control as part of the communications bridge and communications network configuration.

In an embodiment the addressing arrangement for execution units is configured such that if an execution unit is not physically present, this can still be logically handled (e.g., and in an embodiment, by the job manager). This provides a mechanism for implementing graphics processing units with different physical numbers of execution units whilst still using the same logical design for each job manager, for example.

In an embodiment, a graphics processing unit that can act as a master graphics processing unit (and in an embodiment the job manager of the master graphics processing unit) is configured to be able to distribute subtasks for a given graphics processing task to be performed by a linked set of graphics processing units that the graphics processing unit is a master for to all the execution units in the maximum number of slave units that it could be linked to (i.e. the maximum sized "combined" graphics processing unit that could be visible to it).

The graphics processing unit (and in an embodiment a job manager of the graphics processing unit) that is capable of acting as a master graphics processing unit can in an embodiment then be configured in use to not use some execution units in the overall set of execution units of the linked set of graphics processing units (if required or desired). This may be applicable, e.g., where the graphics processing unit is acting as a master graphics processing unit for less than the full set of possible slave graphics processing units.

The desired "addressable" ("useable") execution unit configuration can be set (configured) in any suitable and desired manner. In an embodiment this can only be reconfigured through external logic control that is external to the graphics processing unit (i.e. such that any application controlling the graphics processing unit to perform graphics processing tasks cannot itself operate to set the configuration of the graphics processing unit). This may be beneficial for security purposes.

In an embodiment the useable execution unit configuration can be performed by setting that control configuration via external register interfaces to the graphics processing units. Again, in an embodiment, there may be a set of registers for setting the useable execution unit configuration that can only be controlled (set) by a hypervisor, with the, e.g. job manager's, normal registers being settable by "guests".

It is also in an embodiment the case that any useable execution unit reconfiguration of a graphics processing unit is only able to happen, and only happens, during reset of the graphics processing unit. In an embodiment the configuration setting takes the form of a bit mask that enables the logical removal of individual execution units.

When a graphics processing unit is operating in slave mode (as a slave graphics processing unit under the control of another "master" graphics processing unit), then the operation of the graphics processing unit is in an embodiment configured accordingly. Thus, for example, in an embodiment, the job manager of a graphics processing unit is disabled when the graphics processing unit is operating in slave mode (since, as discussed above, when a graphics processing unit is operating in slave mode and linked to another "master" graphics processing unit, the master graphics processing unit will provide the software interface and distribute graphics processing "subtasks" for execution to the execution units of the slave graphics processing unit).

Correspondingly, in an embodiment, when a graphics processing unit is acting as a slave graphics processing unit, then any functional units that are not required on the slave graphics processing unit, such as a tiler unit and/or a memory management unit of the slave graphics processing unit, are in an embodiment configured to be inactive. Thus any functional units that are redundant in a slave graphics processing unit are in an embodiment made inactive when the graphics processing unit is configured to operate in its "slave" mode.

There may be multiple slave modes depending where the graphics processing unit is located in the overall topology of the plurality of graphics processing units, e.g. when multiple graphics processing units are slaved to one master.

As discussed above, in an embodiment, each graphics processing unit has a cache (and in an embodiment a level 2 cache). In that case, when plural graphics processing units are linked to form a set of linked graphics processing units with a master graphics processing unit and one or more slave graphics processing units, then the combined set of linked graphics processing units will contain multiple, e.g. level 2, caches. In such an arrangement, in an embodiment, different caches are used for different addresses (cache lines) (address ranges), as this may make the use of the multiple caches more efficient.

This can be achieved in any suitable and desired manner, but in an embodiment is achieved by making the routing for memory transaction requests from clients to the (e.g. level 2) cache dependent on a hash function of the address, with the computed hash value then being used to lookup the destination (e.g. level 2) cache for the request, e.g., in a lookup table that associates destination caches with hash values.

Thus there is in an embodiment a set of, in an embodiment predefined, cache routing data for memory transaction requests to the cache, that maps a hash of the memory address to a given cache of a graphics processing unit. This is in an embodiment in the form of a lookup table. The cache routing mapping is in an embodiment configured such that different memory addresses will be mapped to different caches.

Thus, in an embodiment, there is a set of cache mapping data (e.g. a destination cache routing table) that maps memory addresses (hash values) to respective caches of the graphics processing units of the plurality of graphics processing units of the graphics processing system. In an embodiment, there is a different set of cache mapping data (cache routing) for different graphics processing unit operating modes. In particular, there is in an embodiment one set of, in an embodiment predefined, cache routing data for use when a graphics processing unit is being used in a stand-alone mode, and a different (or a plurality of different) set or sets of cache routing data for use when a graphics processing unit is operating as part of a larger linked set of graphics processing units (e.g. with there being a different set of cache routing data for different possible combinations of linked graphics processing units in the graphics processing system).

In these arrangements, the cache routing data for a graphics processing unit when used in standalone mode is in an embodiment configured such that all entries in the cache routing data point to the internal cache of the graphics processing unit in question. On the other hand, the cache routing data for when a graphics processing unit is operating as part of a larger combined set of graphics processing units, in an embodiment maps (points) different addresses to different caches of the larger linked set of graphics processing units, e.g., and in an embodiment, so as to distribute the cache load across the linked set of graphics processing units and thereby better utilise the caches of the graphics processing units in the linked set of graphics processing units.

Thus, in an embodiment, the routing of data to the caches of the graphics processing units is configured such that: when a graphics processing unit is operating in a standalone mode, in which the graphics processing unit operates independently of the other graphics processing units to perform a graphics processing task, all data to be cached for the graphics processing unit will be stored in the cache of that graphics processing unit; and when two or more of the graphics processing units are operating as a linked set of a master and one or more slave graphics processing units, data to be cached for the set of two or more graphics processing units will be stored in different caches of the caches of the graphics processing units of the linked set of graphics processing units, in dependence on the memory addresses associated with the data.

The cache routing configuration can be set (configured) in any suitable and desired manner. In an embodiment this can only be reconfigured through external logic control that is external to the graphics processing unit (i.e. such that any application controlling the graphics processing unit to perform graphics processing tasks cannot itself operate to set the cache routing configuration of the graphics processing system). This may be beneficial for security purposes.

In an embodiment the cache routing configuration can be performed by setting that control configuration via external register interfaces to the graphics processing units. It is also in an embodiment the case that any cache routing reconfiguration of a graphics processing unit is only able to happen, and only happens, during reset of the graphics processing unit.

Although the technology described herein is described above primarily with reference to the operation of the system comprising a plurality of graphics processing units, the technology described herein also extends to the provision of a single graphics processing unit that can be used in such a system.

Thus, another embodiment of the technology described herein comprises a graphics processing unit comprising:
one or more functional units; and
a communications bridge for connecting the graphics processing unit to another graphics processing unit that can allow communication between the graphics processing unit and a connected graphics processing unit via the communications bridge;
wherein:
the graphics processing unit is capable of operating as at least one of:
a master graphics processing unit controlling graphics processing operations on another graphics processing unit to which it is connected via its communications bridge; and
a slave graphics processing unit performing graphics processing operations under the control of another graphics processing unit to which it is connected via its communications bridge.

As will be appreciated by those skilled in the art, these embodiments of the technology described herein can, and in an embodiment do, include any one or more or all of the optional features of the technology described herein discussed herein, as appropriate.

Thus the graphics processing unit in an embodiment comprises one or more of, and in an embodiment all of, the various functional or other units discussed for the graphics processing units above.

As discussed above, the graphics processing system of the technology described herein will be part of an overall data processing system that includes the graphics processing system and, e.g., one or more host processors. The host processor(s) will execute applications that require graphics processing operations to be performed by the graphics processing system, and may, and in an embodiment does, execute one or more drivers (for the graphics processing system/units) that are operable to interface between applications executing on the host processor and the graphics processing system, e.g. to communicate graphics processing tasks appropriately from the host processor to (the graphics processing units of) the graphics processing system.

Thus, the overall data processing system that the graphics processing system is part of in an embodiment comprises a host processor that executes applications that can require graphics processing by the graphics processing pipeline. The host processor is in an embodiment operable to send appropriate commands and data to the graphics processing system to control it to perform graphics processing operations and to produce graphics processing outputs required by applications executing on the host processor.

Thus in an embodiment, the graphics processing system is in communication with a host microprocessor (that is part of an overall data processing system) that executes a driver or drivers for the graphics processing system. The graphics processing system and/or host microprocessor are in an embodiment also in communication with a display for displaying the images generated by the graphics processing system (thus in an embodiment the data processing system further comprises a display for displaying the images generated by the graphics processing sy stem).

The technology described herein accordingly also extends to the overall data processing system that the graphics processing system of the technology described herein may be part of.

Thus, a further embodiment of the technology described herein comprises a data processing system comprising:
a host processor; and
a graphics processing system;
wherein:
the host processor is operable to execute applications that require graphics processing operations to be performed by the graphics processing system; and
executes one or more drivers that are operable to interface between applications executing on the host processor and the graphics processing system;
and
the graphics processing system comprises:
a plurality of graphics processing units, each graphics processing unit of the plurality of graphics processing units being connected to at least one other graphics processing unit of the plurality of graphics processing units via a communications bridge that can allow communication between the connected graphics processing units;
and wherein
at least one of the graphics processing units of the plurality of graphics processing units is operable to act as a master graphics processing unit controlling graphics processing operations on another one or ones of the graphics processing units of the plurality of graphics processing units; and
at least one of the graphics processing units of the plurality of graphics processing units is operable as a slave graphics processing unit to perform graphics processing operations under the control of a master graphics processing unit of the plurality of graphics processing units.

A further embodiment of the technology described herein comprises a method of operating data processing system that comprises:

a host processor; and a graphics processing system;

wherein:

the host processor is operable to execute applications that require graphics processing operations to be performed by the graphics processing system; and executes one or more drivers that are operable to interface between applications executing on the host processor and the graphics processing system;

and the graphics processing system comprises:

a plurality of graphics processing units, each graphics processing unit of the plurality of graphics processing units being connected to at least one other graphics processing unit of the plurality of graphics processing units via a communications bridge that can allow communication between the connected graphics processing units;

and wherein at least one of the graphics processing units of the plurality of graphics processing units is operable to act as a master graphics processing unit controlling graphics processing operations on another one or ones of the graphics processing units of the plurality of graphics processing units; and at least one of the graphics processing units of the plurality of graphics processing units is operable as a slave graphics processing unit to perform graphics processing operations under the control of a master graphics processing unit of the plurality of graphics processing units;

the method comprising:

the host processor communicating a graphics processing task to a graphics processing unit of the graphics processing system; and the graphics processing unit that receives the graphics processing task from the host processor, performing some or all of the graphics processing task.

As will be appreciated by those skilled in the art, these technology described hereins and embodiments of the technology described herein can and in an embodiment do include any one or more or all of the optional features of the technology described herein described herein, as appropriate.

Thus, for example, the graphics processing units of the graphics processing system in an embodiment comprise any one or more or all of the functional units, etc., for the graphics processing units discussed above, and it is in an embodiment the driver on the host processor that communicates the graphics processing task to the graphics processing unit.

The data processing system can operate with the graphics processing units of the graphics processing system either acting in standalone mode, or to provide one or more linked sets of a master and one or more slave graphics processing units for executing graphics processing tasks required by the host processor (e.g., and in an embodiment, by an application executing on the host processor).

In the case of operation in standalone mode, the host processor will accordingly communicate the graphics processing task to a graphics processing unit of the graphics processing system, and that graphics processing unit will then perform the entire graphics processing task. In this case, the host processor may, and in an embodiment does, communicate separate, respective graphics processing tasks to plural respective separate graphics processing units of the graphics processing system that are each operating in standalone mode, and each graphics processing unit then performs its allocated graphics processing task (in its entirety).

On the other hand, when the graphics processing units are to operate as a linked set of a master and one or more slave graphics processing units, the host processor will communicate a graphics processing task to one of the graphics processing units (that is acting as the master graphics processing unit) and that graphics processing unit will then distribute the processing for the graphics processing task between its own execution and functional units and execution and functional units of the other (slave) graphics processing units that it is linked to. Thus in this case, the graphics processing unit that receives the graphics processing task (which will be the "master" graphics processing unit) should, and in an embodiment does, perform some but not all of the processing for the graphics processing task, and will also operate to distribute some of the processing for the graphics processing task to other graphics processing units of the graphics processing system that it is linked to (such that the processing for the graphics processing task will be performed both by the graphics processing unit that receives the graphics processing task from the host processor and by one or more other graphics processing units that are linked to that graphics processing unit).

Thus, in one embodiment the host processor (e.g., and in an embodiment, a driver for a graphics processing unit executing on the host processor) operates to send a graphics processing task to the graphics processing system for execution by a graphics processing unit of the graphics processing system in standalone mode. In this case, the, e.g., and in an embodiment, job manager, of the graphics processing unit that is to perform the graphics processing task will receive the graphics processing task from the host processor (from the driver), divide that graphics processing task into appropriate subtasks for the execution units of the graphics processing unit and distribute those subtasks to the execution units of the graphics processing unit for processing. The graphics processing unit will then perform the subtasks to complete the graphics processing task and return the result of the graphics processing task (e.g. an output frame) appropriately.

Correspondingly, in another embodiment, when graphics processing units of the graphics processing system are to operate as a linked set of a master and one or more slave graphics processing units for executing a graphics processing task for the host processor (for an application executing on the host processor), then in an embodiment the host processor (e.g., and in an embodiment the driver on the host processor) communicates the graphics processing task in question to the master graphics processing unit (e.g., and in an embodiment, to the job manager of the master graphics processing unit), which master graphics processing unit (e.g. its job manager) then partitions the graphics processing task into subtasks, and then distributes those subtasks for processing to execution units of the master graphics processing unit and of one or more of the slave graphics processing units that it is controlling and linked to.

The slave graphics processing units will receive the relevant subtasks for processing from the master graphics processing unit, process those tasks and return their results accordingly. The execution units on the slave graphics processing units may, e.g., signal the job manager on the master graphics processing unit when they have completed their tasks, via the relevant communication bridges, in a similar way to the way that the execution units on the master GPU will signal the job manager on completion of their tasks.

As discussed above, the slave graphics processing units may communicate directly with the master graphics processing unit where they are connected directly to each other by their respective communication bridges. Alternatively, a slave graphics processing unit may communicate with the master graphics processing unit via one or more other linked slave graphics processing units, depending upon the configuration of the graphics processing units. Thus some slave graphics processing units may operate to pass communications between the master graphics processing unit and another slave graphics processing unit.

In both these arrangements the host processor (e.g. and in an embodiment the driver(s) for the graphics processing system and/or units on the host processor) in an embodiment first configures the graphics processing unit or units to the appropriate operating mode, e.g. configures the relevant communication bridges between the graphics processing units appropriately and the, e.g., job managers of the graphics processing units appropriately (as discussed above). In the case where one or more of the graphics processing units are operating as slave graphics processing units, then in an embodiment any unrequired execution units, such as tilers, in the slave graphics processing units are also disabled as part of this configuration process.

As will be appreciated by those skilled in the art, as well as the elements and stages described above, the graphics processing units can otherwise include, and in an embodiment do include, any one or one or more, and in an embodiment all, of the other processing stages that graphics processing units normally include. Thus, for example, the graphics processing units in an embodiment include a primitive setup stage, a rasteriser and a renderer. In an embodiment the renderer is in the form of or includes a programmable fragment shader.

The graphics processing units may also contain any other suitable and desired processing stages that a graphics processing unit may contain such as a depth (or depth and stencil) tester(s), a blender, a write out unit etc.

The programmable, execution (shading) stages (units) of the graphics processing pipeline can be implemented as desired and in any suitable manner, and can perform any desired and suitable shading, e.g. vertex shading, fragment shading, etc., functions, respectively and as appropriate.

Each programmable processing stage (shader) (execution unit) may comprise any suitable programmable hardware element such as programmable processing circuitry. Each programmable processing stage (shader) (execution unit) may be provided as a separate circuit element to other programmable stages (shaders) (execution units) of a graphics processing unit or the programmable processing stages (execution units) may share some or all of their programmable processing circuitry (that is then differently programmed to serve as the desired programmable processing stage (shader)).

In an embodiment, the graphics processing units comprise, and/or are in communication with, one or more memories and/or memory devices that store the data described herein, and/or that store software for performing the processes described herein.

The technology described herein may be carried out by any kind of graphics processing system. However, in an embodiment, the graphics processing system is a tile-based (tiling) graphics processing system. In this case, the graphics processing units in an embodiment also each comprise a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein are carried out on a single graphics processing platform that generates and outputs the rendered fragment data that is, e.g., written to a frame buffer for a display device.

Thus the graphics processing system should (and in an embodiment does) produce some useful output data, e.g. graphics processing output data for use in (subsequent) graphics processing operations etc. In an embodiment, the generated output data is used to provide an image for display, e.g. is provided to a display for display.

The technology described herein can be implemented in any suitable system, such as a suitably configured microprocessor based system. In some embodiments, the technology described herein is implemented in computer and/or micro-processor based system.

The technology described herein can be used for all forms of output that a graphics processing system may output. Thus, it may be used when generating frames for display, render-to-texture outputs, etc.

Although the technology described herein has been described above with particular reference to the operation of the graphics processing system to produce, e.g., frames for display, the graphics processing system and the technology described herein can equally be used where the graphics processing system is to be used to provide other processing and operations and outputs, for example that may not have or may not relate to a display or images. For example, the technology described herein can equally be used for non-"graphics" use cases such as ADAS (Advanced Driver Assistance Systems) which may not have a display and which may deal with sensor data which isn't an image (e.g. radar). In general, the technology described herein can be used for any desired GPGPU (general purpose GPU) operations.

The various functions of the technology described herein can be carried out in any desired and suitable manner. For example, the functions of the technology described herein can be implemented in hardware or software, as desired. Thus, for example, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on data processor, a computer program comprising computer software code for performing the methods herein described when the program is run on data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processing unit, or other system comprising data processor causes in conjunction with said data processor said processing unit, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

FIG. 1 shows a data processing system 9 that includes a host processor 1 and a graphics processing system 3.

As shown in FIG. 1, the graphics processing system 3 comprises a pair of linked graphics processing units (GPUs) 5, 6 that can communicate with each other. As will be discussed further below, in accordance with the technology described herein, the linked graphics processing units 5, 6 of the graphics processing system 3 can be operated in various modes, namely either as "standalone" graphics processing units, or as a linked set of a master and a slave graphics processing unit. (Although FIG. 1 shows the graphics processing system 3 as comprising two linked graphics processing units, any desired number of plural linked graphics processing units can be used for the graphics processing system 3.)

In use of this system, an application 2, such as a game, executing on the host processor 1 will require graphics processing operations to be performed by the associated graphics processing system 3. To do this, the application will generate API (Application Programming Interface) calls that are interpreted by a driver 4 for the graphics processing system 3 that is running on the host processor 1 to generate appropriate commands to the graphics processing system 3 to generate graphics output required by the application 2.

The driver 4 will then send (e.g. commands and data for) the relevant graphics processing tasks to the graphics processing system 3 for processing by the graphics processing system 3 to generate the desired graphics output (e.g. frame to be displayed).

As shown in FIG. 1, the GPUs 5, 6 of the graphics processing system 3 are able to be linked to each other. This allows a GPU to optionally be linked up with the other GPU to work cooperatively on a given task. The GPU link mechanism is implemented in hardware and is transparent to the host processor 1 (to software), such that the linked GPUs appear as a single larger GPU to the host software (e.g. driver 4). This allows the host processor 1 to be used in different situations, either with two separate GPUs to execute multiple functions, or with the GPUs linked to execute fewer (or a single) function with higher performance.

In the present embodiment, each GPU 5, 6 of the graphics processing system 3 can operate in a standalone mode, and either in a master mode or a slave mode. In standalone mode the GPU operates independently under direct control from the host processor 1. In master mode the GPU controls the other GPU operating in slave mode, and provides the software interface (the host processor interface) for the linked set of GPUs. In slave mode the GPU operates under control of the master GPU.

Figure 2:
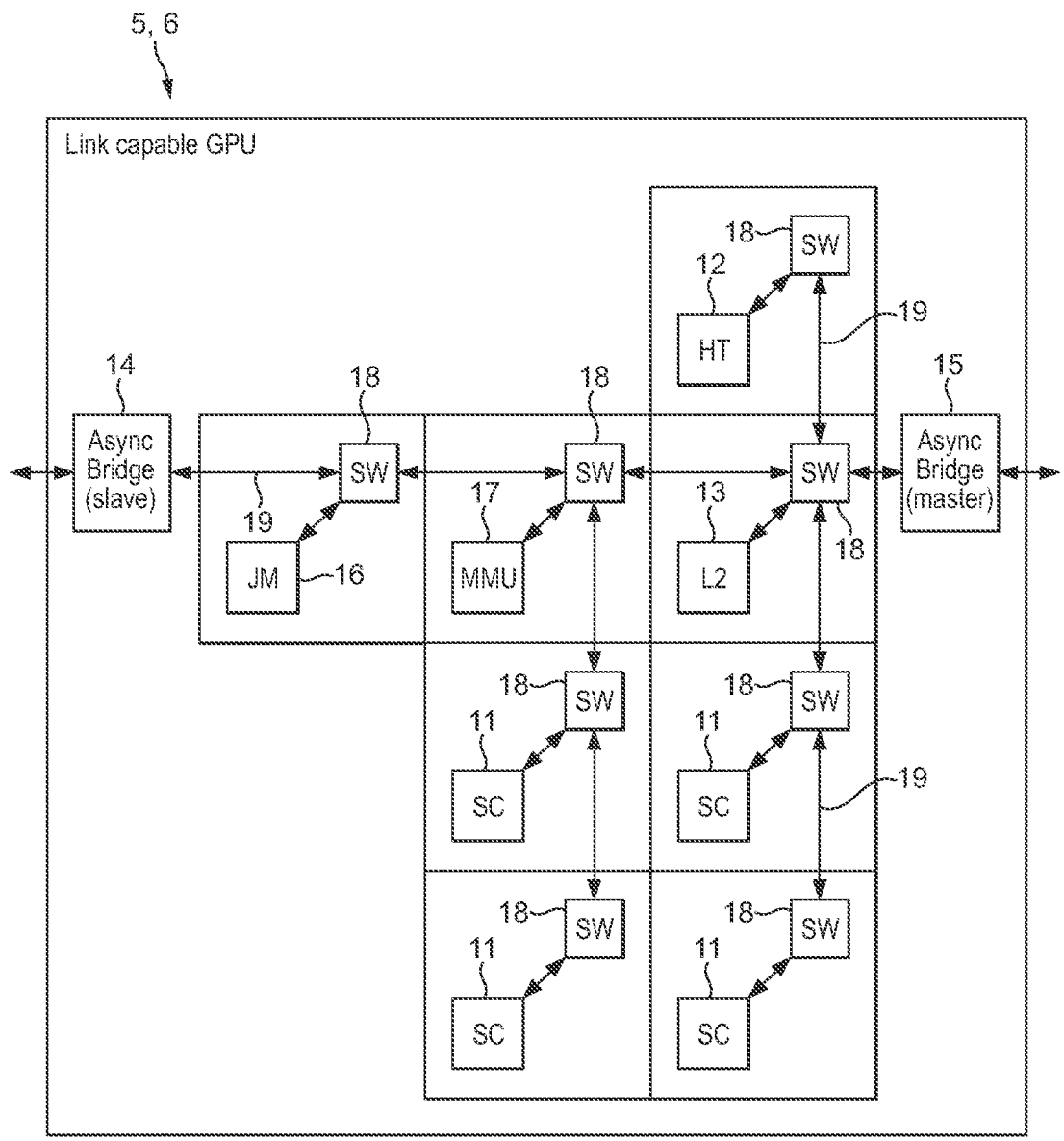
FIG. 2 shows schematically an embodiment of a graphics processing unit of the graphics processing system shown in FIG. 1.

FIG. 2 shows in more detail the arrangement and components of each graphics processing unit (GPU) of the graphics processing system 3 in the present embodiments.

It should be noted here that FIG. 2 (and the other Figures) for clarity purposes only show the elements, components, links, etc. of the graphics processing system that are relevant to the particular operation of the technology described herein that is being described. Thus, for example, FIG. 2 (and correspondingly FIGS. 3 and 6) for clarity purposes only show the communication lines that form the internal communications network within the graphics processing unit and that link to a linked graphics processing unit. There would, of course, be other communications links and buses in the graphics processing system which are not shown in these Figures. For example, each L2 cache will be connected to the system bus, and the job manager of a graphics processing unit will have a (separate) connection to provide the register interface to the host.

As shown in FIG. 2, in the present embodiments each GPU of the graphics processing system 3 comprises one or more execution units, such as programmable processing (shader) cores 11 (SC) and a tiler 12 (HT). (The graphics processing units 5, 6 in the present embodiment (and accordingly the graphics processing system 3) are tile-based graphics processing units. Other arrangements would, of course, be possible.) Different GPUs may have different sets of execution units, and there are more potential types than these two.

Each GPU also includes a level 2 cache 13 (L2) incorporating the interface to the external memory system. A GPU may also include a memory management unit (MMU) 17, but this may also be located externally to the GPU.

Each GPU also includes one or more communication bridges, namely a slave bridge 14 for connecting a master GPU (the master GPU may be connected directly, or through a daisy-chain of other slave GPUs), and a master bridge 15 for connecting slave GPUs. The master bridge is used in master mode to connect one or more (through daisy-chaining) slave GPUs, and may also be used in slave mode to connect further daisy-chained slave GPUs.

In the present embodiments, the master and slave bridges are implemented to support an asynchronous interface between GPUs, as this allows easier physical implementation of the GPUs as the clock can then be independent also when the GPUs are linked.

Each GPU also includes a jobmanager 16 (JM). This provides the host (software) interface for the GPU, and thus receive tasks (and commands and data) from the (driver 4 on the) host processor 1 and partitions a task given by the host processor 1 (the driver 4) into subtasks and distributes the subtasks for execution to the various execution units (shader cores, tiler) of the GPU.

Where a GPU is able to operate as a master GPU, the job manager 16 is configured to also be able to control execution units of linked slave GPUs. Correspondingly, for a GPU that is able to operate as a slave GPU, the job manager 16 is able to be disabled when the GPU is operating in slave mode.

As shown in FIG. 2, the various functional units, etc., of the (and each) GPU are connected to each other (communicate with each other) using a message based interconnect 19 that uses switches 18 (SW). The interconnect 19 carries various traffic such as memory transactions between execution units and the level 2 cache (L2), subtask control traffic between the job manager and execution units, and so on.

As shown in FIG. 2, the interconnect also connects to the respective master and slave bridges 15, 14 of the GPU and includes appropriate switches 18 that can be activated to enable or disable communication across (via) the bridges to a connected GPU.

The different operating modes of the GPU (standalone, master and slave modes) are set (enabled and disabled) by configuring the routing of the interconnect appropriately, by appropriate setting of the switches 18. Thus, for example, when the GPU is to operate in standalone mode, the switches connecting the bridges 14, 15 are set to disable (prevent) communication via (across) the bridges. Correspondingly, when a GPU is to act as a master GPU, the switches are set to enable communication with a connected GPU via the master bridge 15. Correspondingly, when a GPU is to act as a slave, the switches are set to enable communication with a connected GPU via the slave bridge.

In the present embodiments, the routing control is reconfigured through a logic wire controlled externally to the GPU, and any routing (re-)configuration only happens during reset of a GPU. Other arrangements would, of course, be possible.

Figure 3:
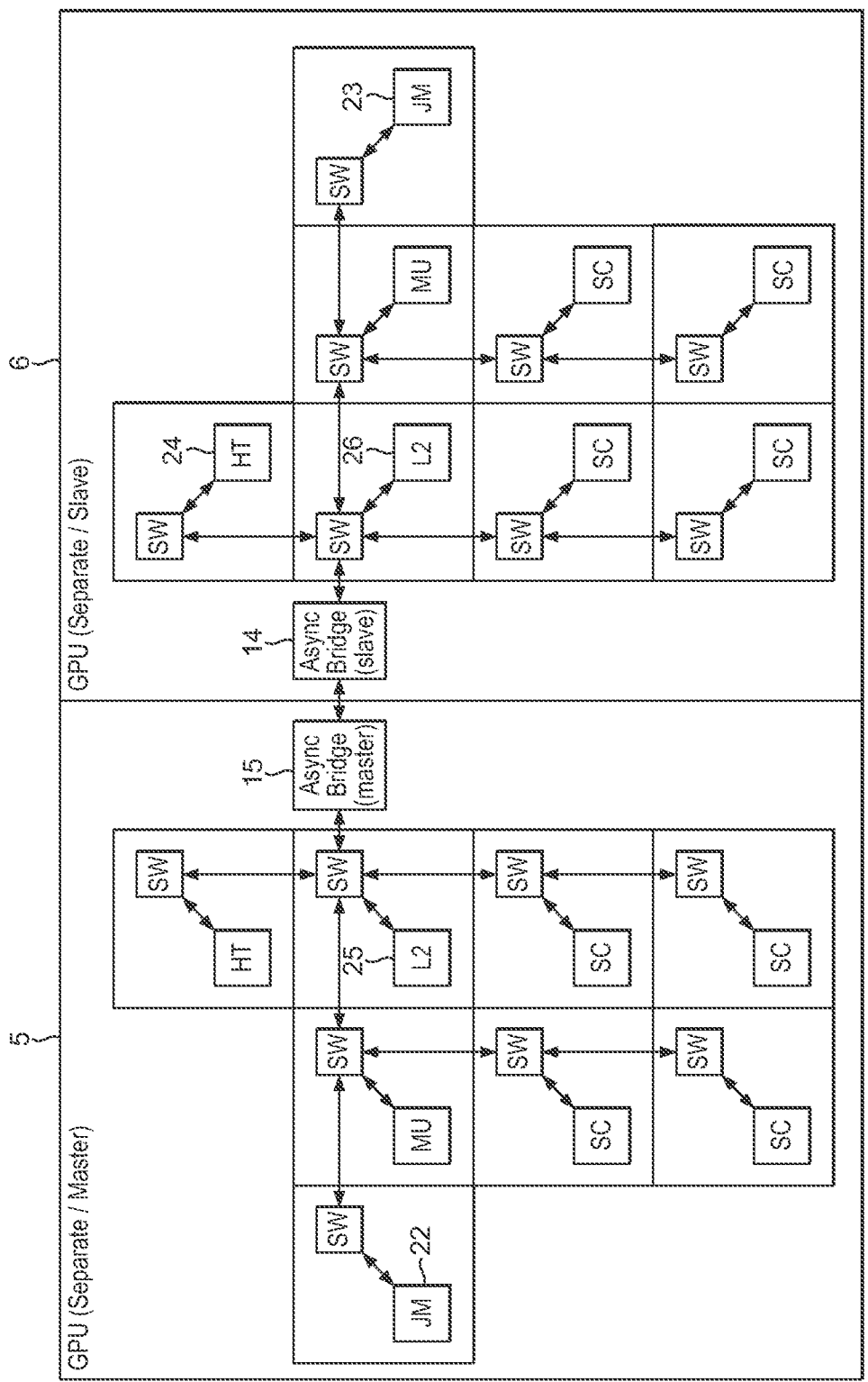
FIG. 3 shows schematically and in more detail the graphics processing system that is shown in FIG. 1.

FIG. 3 shows in more detail the arrangement of the two linked GPUs 5, 6 of the graphics processing system 3 in the present embodiment. As shown in FIG. 3, the graphics processing unit 5 can operate either in a standalone mode or as a master GPU, and is connected to the other GPU 6 via its master bridge 15 connecting to the slave bridge 14 of the second GPU 6. The second GPU 6 is accordingly correspondingly operable either in a standalone mode or as a slave GPU.

Thus, in this embodiment, the two four shader core GPUs 5, 6 may either operate as standalone, four shader core GPUs, or may be linked to form a single eight shader core GPU, with the first GPU 5 acting as a master GPU controlling the execution units on the GPU 6 acting as a slave a GPU.

The job manager 22 of the GPU 5 that is operable as a master GPU is configured to control 8 shader cores. Then when the master-capable GPU 5 is used in stand alone mode, the four shader cores corresponding to the slave GPU 6 are disabled, e.g. through external configuration wires.

It would be possible to remove other shader cores, e.g. the slave GPU 6 could be implemented as having only three shader cores. In this case the job managers (master and slave GPU) are configured such that the "missing" shader core is not utilized in any of the configurations.

Figure 4:
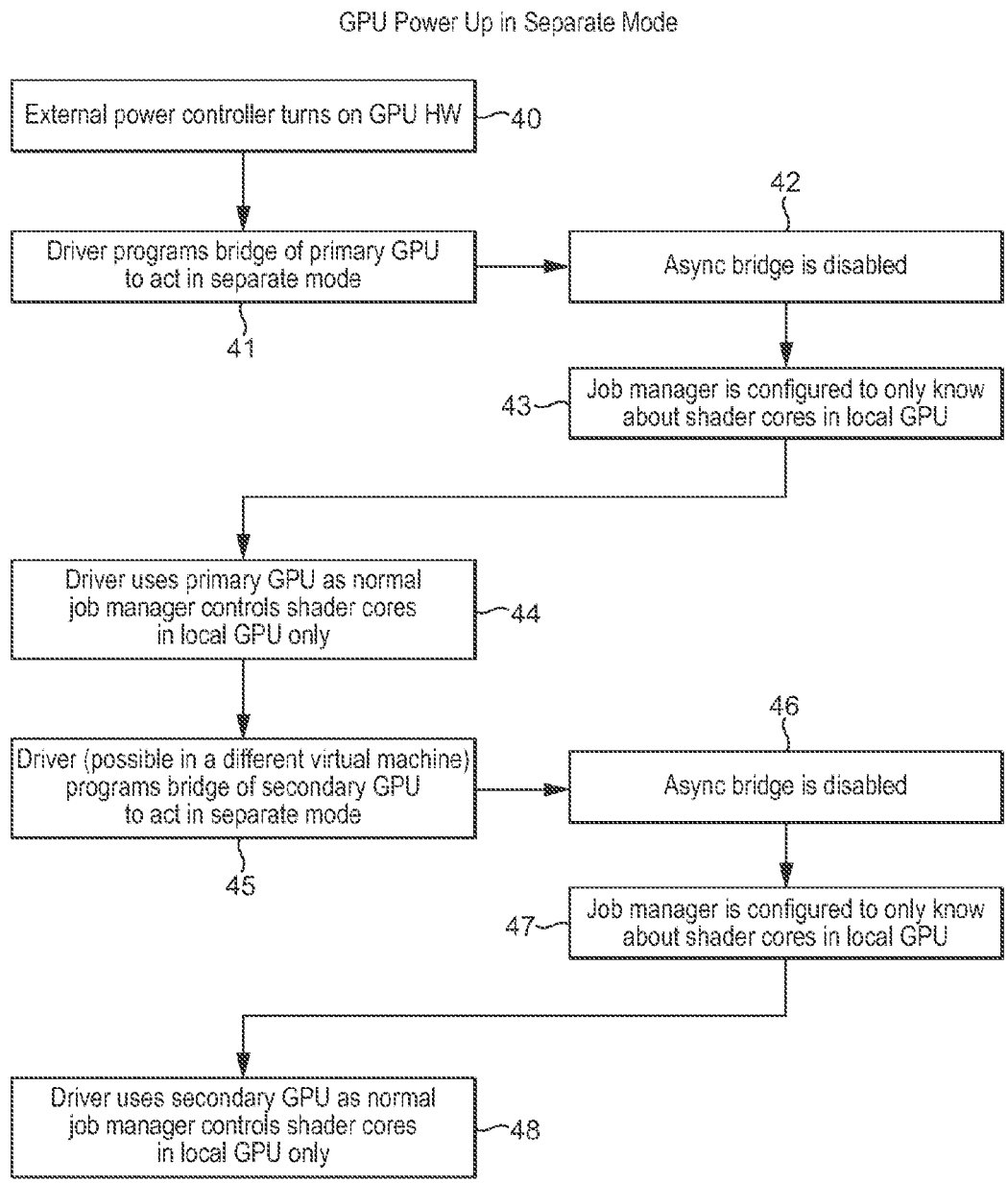
FIG. 4 shows one mode of the operation of the graphics processing system of FIG. 1.

FIG. 4 shows the operation of the GPUs 5, 6 when they are both being operated in standalone mode.

As shown in FIG. 4, the process starts with powering on the GPUs 5, 6 (step 40).

The driver 4 on the host processor 1 then programs the bridge 15 of the first GPU 5 to act in a standalone mode (step 41). As shown in FIG. 4, as part of this configuration, the master bridge 15 of the GPU 5 is disabled and the job manager 22 of the GPU 5 is configured to know only about the shader cores of the GPU 5 (steps 42 and 43).

The driver on the host processor can then convey graphics processing tasks for the graphics processing unit 5 in the normal manner, with its job manager 22 distributing those processing tasks to and controlling its own shader cores only (step 44).

As shown in FIG. 4, it would also be possible in this arrangement for a separate graphics processing task or tasks to be sent to and performed on the other GPU 6 operating in standalone mode as well. In this case the driver 4 on the host processor (possibly executing on a different virtual machine on the host processor 1), may additionally program the bridge 14 of the second GPU 6 to act in the standalone mode (step 45), so as to disable the slave bridge 14 of the second GPU 6 (step 46) and configure the job manager 23 of the second GPU 6 to know only about its local shader cores (step 47). The driver may then convey appropriate graphics processing tasks to the second GPU 6 in the normal manner, with the job manager 23 of the second GPU 6 then distributing those graphics processing tasks to its own shader cores accordingly (step 48).

Figure 5:
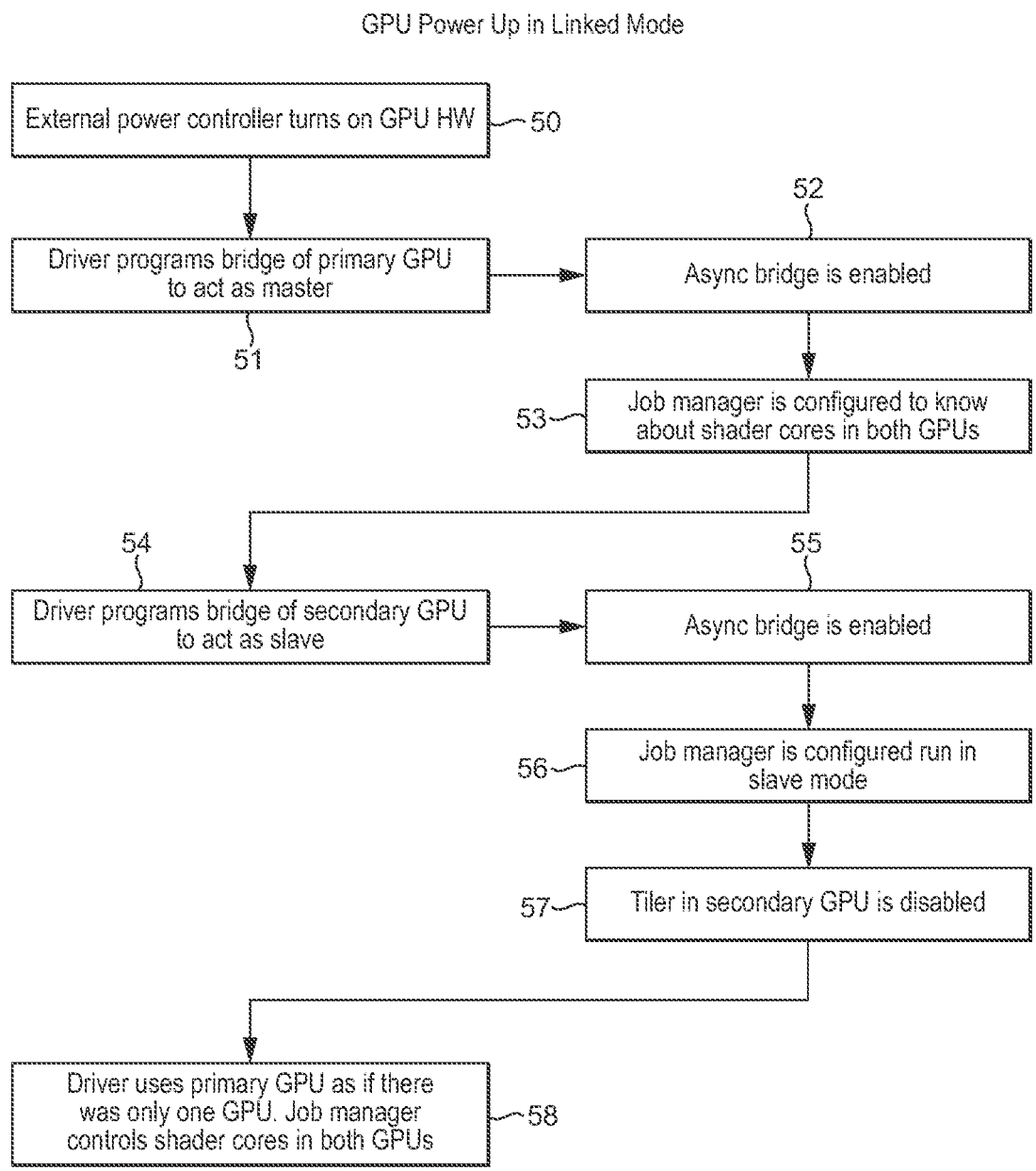
FIG. 5 shows another mode of the operation of the graphics processing system of FIG. 1.

FIG. 5 correspondingly shows the operation of the GPUs 5, 6 when they are being operated as a linked set of a master GPU and a slave GPU. In this case, as discussed above, the GPU 5 will act as a master GPU controlling the GPU 6 as a slave GPU.

In this case, as shown in FIG. 5, the process again starts with powering on the GPUs 5, 6 (step 50).

The driver 4 on the host processor 1 then programs the bridge 15 of the first GPU 5 to act as a master GPU (step 51). As shown in FIG. 5, as part of this configuration, the master bridge 15 of the GPU 5 is enabled and the job manager 22 of the GPU 5 is configured to know about the shader cores in both GPUs 5, 6 (steps 52 and 53).

The driver 4 on the host processor then additionally programs the bridge 14 of the second GPU 6 to act in the slave mode (step 54). As shown in FIG. 5, as part of this configuration, the slave bridge 14 of the GPU 6 is enabled and the job manager 23 of the second GPU 6 is configured to run in slave mode, and the tiler 24 of the second GPU 5 is disabled (steps 55, 56 and 57).

The driver 4 on the host processor 1 then conveys graphics processing tasks to the (job manager 22 on) the master graphics processing unit 5. (So far as the host processor and its driver is concerned, it simply sees a single GPU for this purpose.) The job manager 22 on the master graphics processing unit 5 then operates to partition the processing tasks and distribute subtasks for the processing tasks to both its own shader cores and the shader cores of the connected slave GPU 6 (step 58).

As can be seen from FIG. 3, for example, when the two GPUs 5, 6 are linked as a master and slave, the "combined" GPU will contain multiple level 2 caches 25, 26. To use these more efficiently, in the present embodiments a different level 2 cache is used for different addresses (cache lines).

This is achieved in the present embodiments by making the interconnect routing for memory transaction requests from clients to the level 2 cache dependent on a hash of the address. The hash computed is then used to look up the destination level 2 cache for the request in a table. The table content depends on the GPU mode: when the GPU is used in standalone mode all entries in the table point to the internal level 2 cache, but when the GPU is part of a larger combined GPU different entries point to different level 2 caches to distribute the load across the system and better utilize the level 2 caches.

In the present embodiments, similar to the interconnect routing, the configuration of the cache addressing table is controlled by an external wire (which may be the same as controls the interconnect routing), and is only changed while a GPU is in reset. Other arrangements would, of course, be possible.

Figure 6:
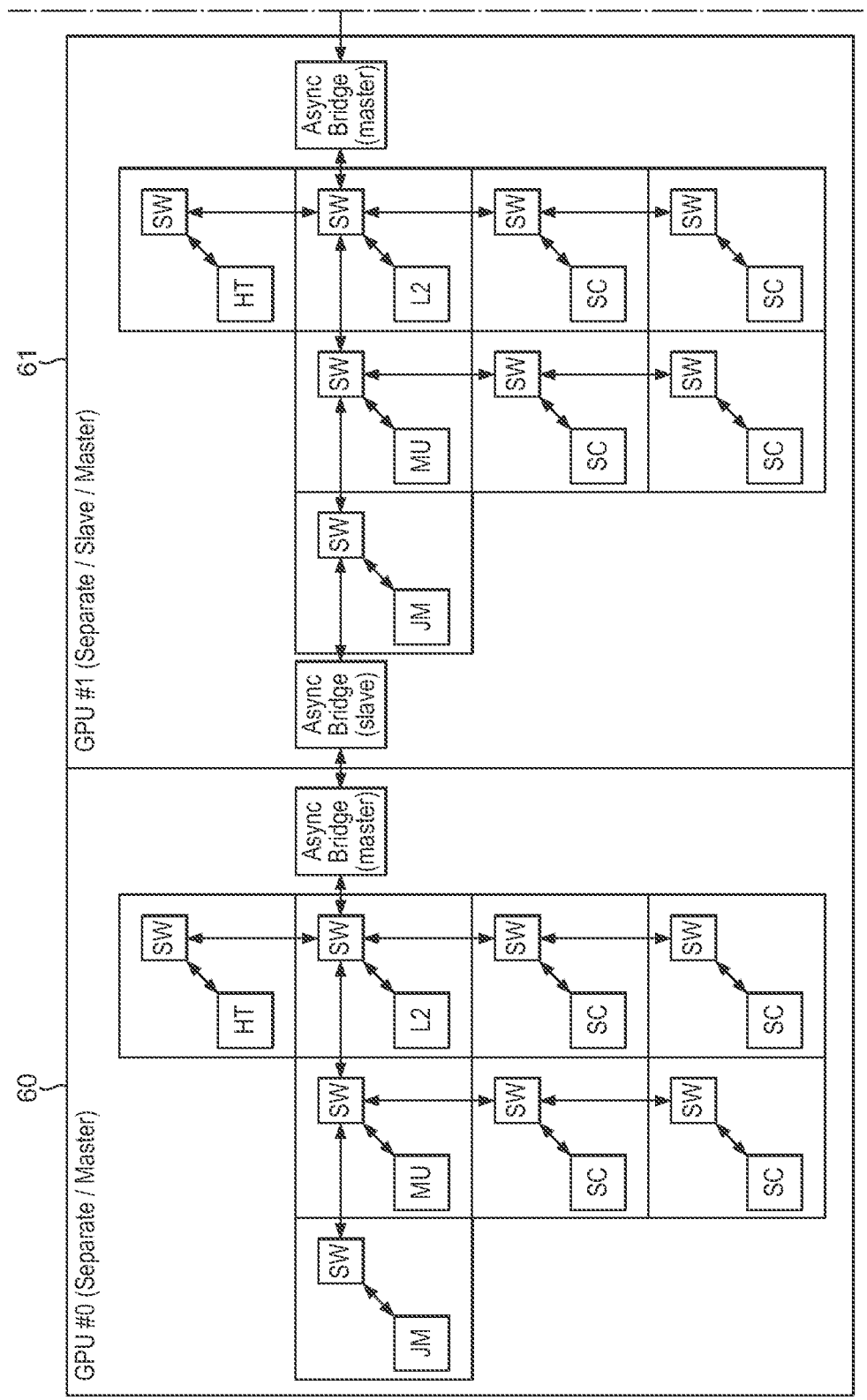
FIG. 6 shows another embodiment of a graphics processing system that is in accordance with the technology described herein.
Figure 6:
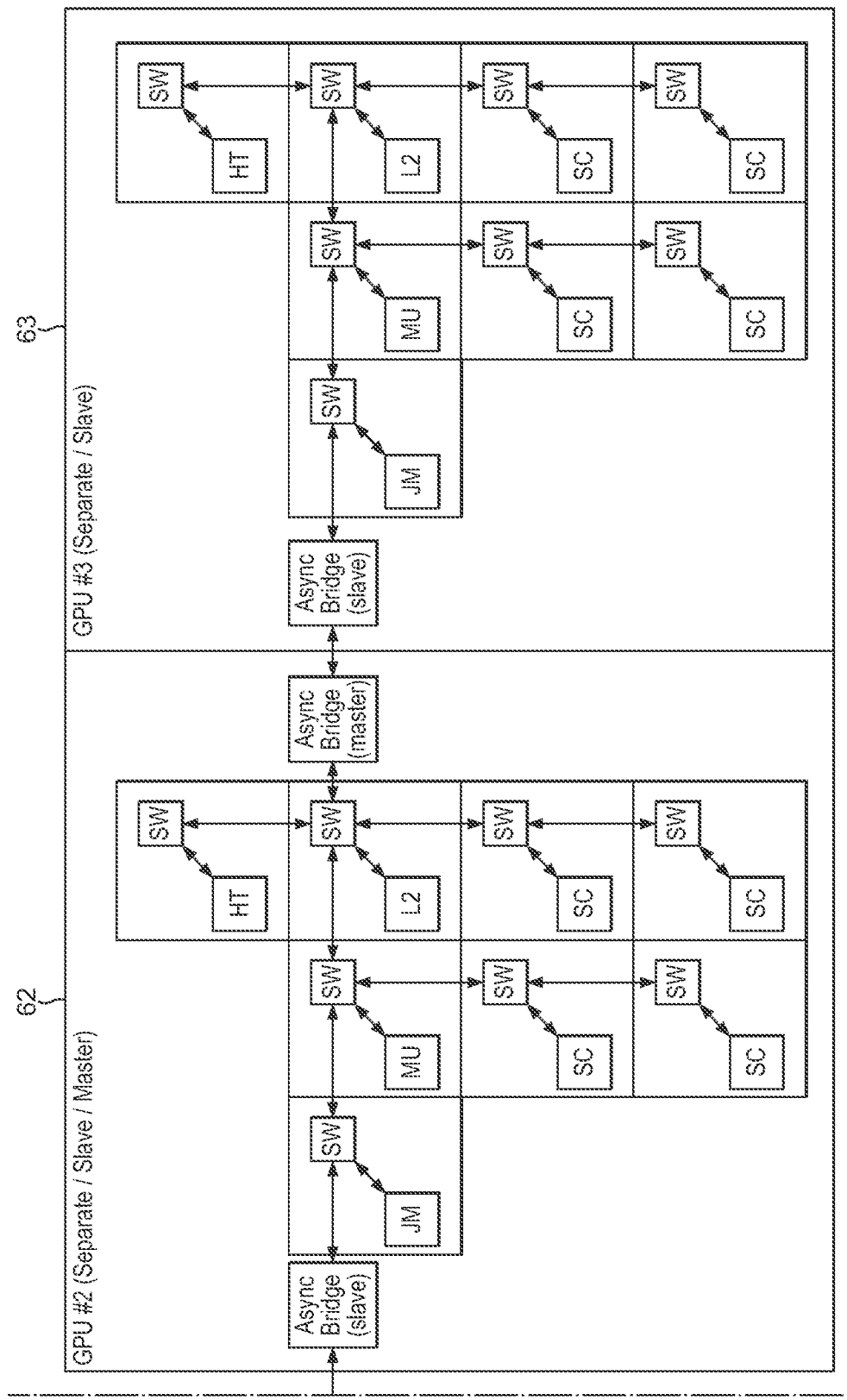

FIG. 6 shows a more complex example of link capable GPUs. In this example there are four GPUs, 60, 61, 62, 63, which can be used in eight different combinations: 1+1+1+1, 2+1+1, 1+2+1, 1+1+2, 2+2, 3+1, 1+3, 4. The four GPUs are not required to all have four shader cores. Individual shader cores can be physically removed from the integrated circuit implementation, as long as they are configured as unused by all relevant job managers.

Figure 7:
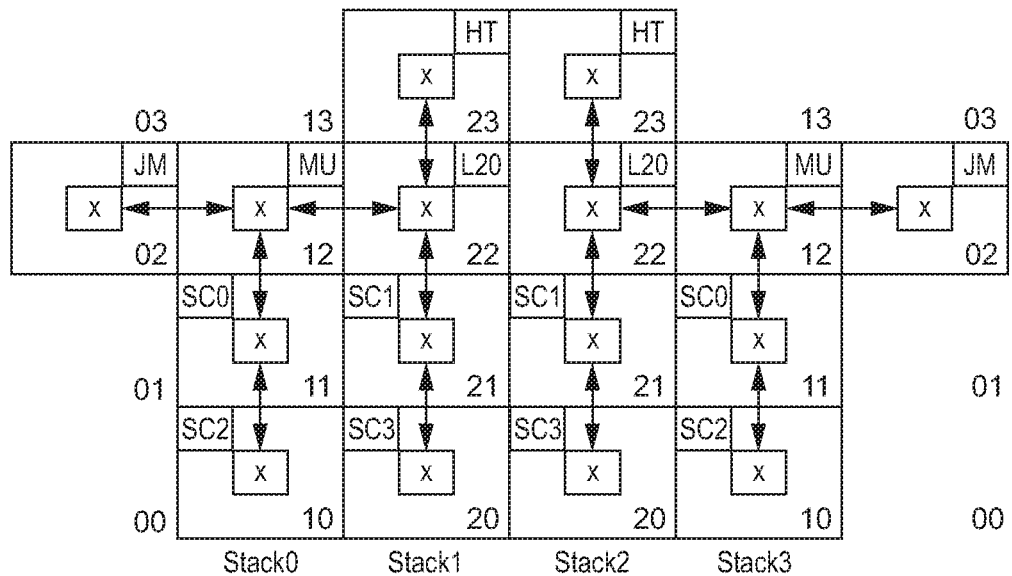
FIGS. 7 and 8 illustrate the routing of messages in an embodiment of the technology described herein.
Figure 8:
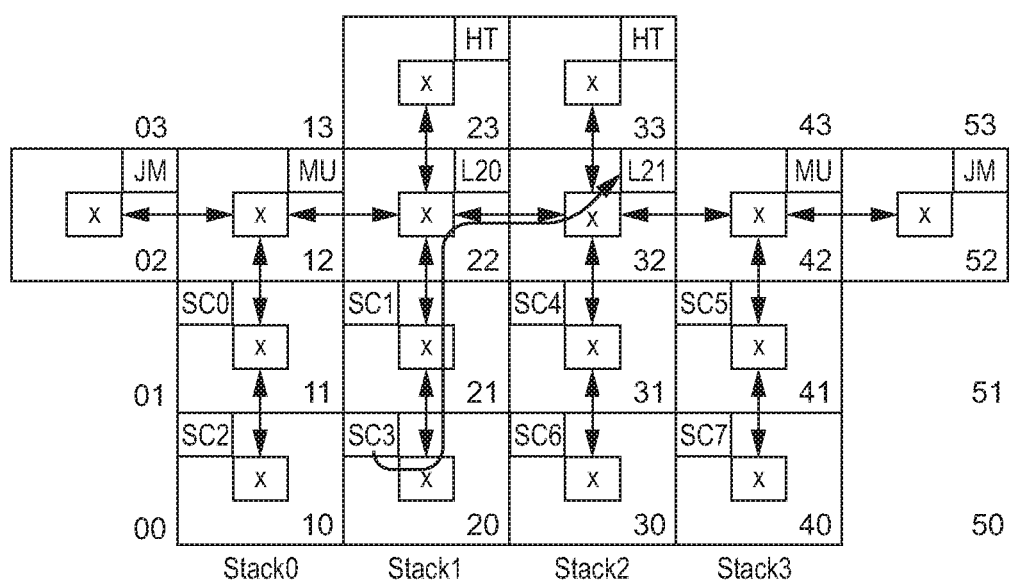

FIGS. 7 and 8 show how the functional units of the graphics processing units are addressed and messages are passed between functional units in an embodiment of the technology described herein.

In these figures, "x" is a communication network switch of a graphics processing unit, "SC" is a shader core, "L2" is an L2 cache, "MU" is an MMU, "HT" is a tiler, and "JM" is a job manager.

FIG. 7 shows an arrangement in which there are two graphics processing units linked together but operating in stand alone mode. FIG. 8 shows the corresponding arrangement when the two graphics processing units are operating as a linked set of a master and slave graphics processing unit.

As shown in FIG. 8, in this arrangement, the tiler, MMU and job manager of the slave graphics processing unit (the right hand graphics processing unit in FIG. 8) are disabled. (The stacks in these figures are respective stacks of shader cores).

As shown in FIGS. 7 and 8, the functional units of the linked graphics processing units are, in effect, placed on an (X, Y) grid, with the functional units then being addressable by their corresponding X, Y coordinates on the grid.

This therefore provides a network topology dependent addressing arrangement for the functional units of the graphics processing units.

In addition to this network topology dependent addressing arrangement, each functional unit of the graphics processing units also has a unique system address that can be used for communications between the graphics processing units. This system address does not identify where the functional unit is in the overall network, but is able to identify the relevant functional unit uniquely for the configuration of the graphics processing system in question.

As shown in FIGS. 7 and 8, both the network topology dependent, X, Y coordinate addresses and the system addresses of the functional units of the graphics processing units are configurable, depending upon the operating modes of the graphics processing units. For example, as can be seen, the addresses used for the functional units in FIG. 7 where both graphics processing units are operating in stand alone mode differ to the addresses used for the functional units in FIG. 8 where the graphics processing units are operating as a linked set of a master and a slave graphics processing unit.

In these arrangements, when a functional unit (such as a shader core, level 2 cache, tiler, etc.) wants to send a message to another functional unit, it will first use the system address of the target functional unit. That address is then converted to the network topology dependent address of the target functional unit (i.e., to the (X, Y) coordinate address where the functional unit is located). This conversion is done in the present embodiments using a "system" address to "network" address lookup table.

The network topology dependent address ((X, Y) coordinate) for the target functional unit is then included with the message for the target functional unit and passed from the functional unit that is sending the message to its associated network switch. The message is then passed from network switch to network switch in turn based on the X, Y coordinate of the target functional address included with the message, until the network switch that is associated with the target functional unit is reached. That switch then passes the message to the target functional unit.

FIG. 8 shows an example of this where it is assumed that shader core SC3 wishes to send a read request to level 2 cache L21.

As shown in FIG. 8, shader core SC9 first converts the system address for the level 2 cache L21 to its corresponding network X, Y address, which is (3,2). It then passes a message packet to its corresponding switch at coordinate (X,Y)=(2,0).

The switch x2y0 then compares the coordinates in the target address of the packet to its coordinates. In the present embodiment, switch x2y0 is configured to compare the Y coordinates first (although it could be configured to compare the X coordinates first, if desired). It then routes the packet to the next switch on the grid on the basis of the Y coordinate comparison. Thus, if the target address Y coordinate is bigger, it routes the packet upwards in Y, but if the target Y coordinate is smaller, it routes the message downwards in Y.

If the target address Y coordinate is the same as the switch's Y coordinate address, it then compares the X coordinates. Again, if the target address X coordinate is bigger, it passes the message upwards in X (i.e. to the right), but if the target X coordinate is smaller, it passes the message downwards along the X axis (i.e. to the left).

If the target X coordinate is the same (and the target Y coordinate was the same), then that indicates that the message is for the functional unit that the switch is associated with, and so it passes the message to its associated functional unit via the local port of the switch.

(The converse process would be used for a switch that is configured to compare the X coordinates first.)

In the example being considered, the switch at (2,0) will determine from the comparison of the Y coordinates that it should pass the packet upwards, and so will pass the packet to the switch at (2,1). As shown in FIG. 8, that switch will correspondingly compare the target address and accordingly pass the packet to switch (2,2). Again, that switch will compare the target address with its own coordinates and accordingly pass the packet to switch (3,2).

Switch x3,y2 will, when it compares the target address in the message with its own coordinates, determine that it is the target address, and so, as shown in FIG. 8, pass the message to the desired level 2 cache, L21.

Other arrangements would, of course, be possible.

This addressing configuration can easily be expanded by placing two or more copies side by side and making the addressing configurable.

Other arrangements would, of course, be possible.

Various alternatives, modifications, changes and additions to the described embodiments of the technology described herein would be possible, if desired.

For example, there may be multiple slave modes depending on where the GPU is located in the overall topology when multiple GPUs are slaved to one master.

In an embodiment the job manager of a master-capable GPU at least is configured to be able to distribute subtasks to all the execution units in the maximum sized combined GPU that may be visible to it. The job manager can then be configured through external wires to not use some execution units. In an embodiment the configuration wires take the form of a bit mask that enables logically removing individual execution units. It is also in an embodiment the case that if a unit is logically removed in the job manager then there is no need for it to be physically present. This provides a mechanism for implementing GPUs with different physical numbers of execution units using the same logical design.

The Applicants have also recognized that some functional units may be redundant in slave GPUs when combining GPUs. For example the tiler or MMUs of the slave GPUs might not be needed (used). Thus in an embodiment, any functional units of GPU that is acting as a slave GPU that are redundant for the slave GPU operation are disabled whilst the GPU is operating as a slave GPU. (However the opposite may also be true and the functional units still in use; this depends on the overall design of the GPU.)

As will be appreciated from the above, the technology described herein, in its embodiments at least, provides a graphics processing system comprising plural graphics processing units that can either be operated as standalone graphics processing units or as one or more linked sets of a master and one or more slave graphics processing units. This then allows the graphics processing system to be used in different configurations, for example either with multiple separate GPUs to execute multiple separate graphics processing functions, or with some or all of the GPUs linked together to execute fewer (or a single) graphics processing function with a higher performance.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A graphics processing system comprising a plurality of graphics processing units, wherein:
   each graphics processing unit of the plurality of graphics processing units is connected to at least one other graphics processing unit of the plurality of graphics processing units via a communications bridge or bridges that can allow communication between the connected graphics processing units;
   at least one of the graphics processing units of the plurality of graphics processing units is operable to act as a master graphics processing unit controlling graphics processing operations on another one or ones of the graphics processing units of the plurality of graphics processing units;
   at least one of the graphics processing units of the plurality of graphics processing units is operable as a slave graphics processing unit to perform graphics processing operations under the control of a master graphics processing unit of the plurality of graphics processing units; and
   each graphics processing unit of the plurality of graphics processing units comprises:
   one or more execution units;
   a management unit that provides an interface with a host processor for the graphics processing unit and is operable to partition a graphics processing task allocated to the graphics processing unit into subtasks and to distribute the subtasks for execution to an execution unit or units of the graphics processing unit;
   and a communications network for providing communications between the units of the graphics processing unit, the communications network comprising a message-based interconnect using switches, and being configurable in use to control communications between the units of the graphics processing unit by configuring the switches in the communication network; and wherein:
   the communications network is further configurable in use to either allow or prevent communication with at least one other graphics processing unit of the plurality of graphics processing units via a communications bridge or bridges by configuring the switches in the communications network.

2. The system of claim 1, wherein the bridges connecting the graphics processing units support an asynchronous interface between the graphics processing units.

3. The system of claim 1, wherein each graphics processing unit of the plurality of graphics processing units is capable of operating in a standalone mode, in which the graphics processing unit operates independently of the other graphics processing units to perform a graphics processing task.

4. The system of claim 1, wherein a graphics processing unit that is operable to act as a master graphics processing unit is operable to, when the graphics processing unit is operating as a master graphics processing unit controlling another graphics processing unit or units of the plurality of graphics processing units operating as slave graphics processing units:
provide an interface with a host processor for the linked set of graphics processing units comprising the master graphics processing unit and its associated slave graphics processing unit or units; and
partition a graphics processing task allocated to the linked set of graphics processing units into subtasks and distribute those subtasks for execution to execution units not only of the master graphics processing unit but also to execution units of the slave graphics processing unit or units that are linked to the master graphics processing unit.

5. The system of claim 1, wherein the graphics processing units each comprise a cache and the routing of data to the caches is configured such that:
when a graphics processing unit is operating in a stand-alone mode, in which the graphics processing unit operates independently of the other graphics processing units to perform a graphics processing task, all data to be cached for the graphics processing unit will be stored in the cache of that graphics processing unit; and
when two or more of the graphics processing units are operating as a linked set of a master and one or more slave graphics processing units, data to be cached for the set of two or more graphics processing units will be stored in different caches of the caches of the graphics processing units of the linked set of graphics processing units, in dependence on the memory addresses associated with the data.

6. The system of claim 5, wherein the routing configuration can only be reconfigured through external logic control that is external to the graphics processing unit.

7. The system of claim 1, wherein:
each graphics processing unit of the plurality of graphics processing units has one or more functional units; and
a communications network topology dependent addressing arrangement is used for communications between the functional units of the graphics processing units.

8. The system of claim 1, further comprising:
a host processor;
wherein:
the host processor is operable to execute applications that require graphics processing operations to be performed by the graphics processing system; and
the host processor executes one or more drivers that are operable to interface between applications executing on the host processor and the graphics processing units of the graphics processing system.

9. A graphics processing unit comprising:
a plurality of functional units, including a management unit that provides an interface with a host processor for the graphics processing unit and is operable to partition a graphics processing task allocated to the graphics processing unit into subtasks and to distribute the subtasks for execution to a functional unit or units of the graphics processing unit;
at least one communications bridge for connecting the graphics processing unit to at least one other graphics processing unit that can allow communication between the graphics processing unit and a connected graphics processing unit via the communications bridge; and
a communications network that provides communications between the functional units of the graphics processing unit, the communications network comprising a message-based interconnect using switches, and being configurable in use to control communications between the functional units of the graphics processing unit by configuring the switches in the communication network;
wherein:
the communications network is further configurable in use to either allow or prevent communication with a connected graphics processing unit or units via a communications bridge or bridge by configuring the switches in the communications network;
and:
the graphics processing unit is capable of operating as at least one of:
a master graphics processing unit controlling graphics processing operations on another graphics processing unit to which it is connected via its communications bridge; and
a slave graphics processing unit performing graphics processing operations under the control of another graphics processing unit to which it is connected via its communications bridge.

10. A method of operating a graphics processing system comprising a plurality of graphics processing units, in which:
each graphics processing unit of the plurality of graphics processing units is connected to at least one other graphics processing unit of the plurality of graphics processing units via a communications bridge or bridges that can allow communication between the connected graphics processing units, and in which:
each graphics processing unit of the plurality of graphics processing units comprises:
one or more execution units;
a management unit that provides an interface with a host processor for the graphics processing unit and is operable to partition a graphics processing task allocated to the graphics processing unit into subtasks and to distribute the subtasks for execution to an execution unit or units of the graphics processing unit;
and a communications network for providing communications between the units of the graphics processing unit, the communications network comprising a message-based interconnect using switches, and being configurable in use to control communications between the units of the graphics processing unit by configuring the switches in the communication network; and wherein:
the communications network is further configurable in use to either allow or prevent communication with the at least one other graphics processing units via the communications bridge or bridges by configuring the switches in the communications network;
the method comprising:
enabling communication between at least two of the graphics processing units of the plurality of graphics processing units by configuring the communications networks of the at least two graphics processing units to allow communication between the at least two graphics processing units via a communications bridge or bridges of the graphics processing units;
and
one of the graphics processing units of the at least two graphics processing units acting as a master graphics processing unit controlling graphics processing operations on the other one or ones of the at least two graphics processing units of the plurality of graphics processing units with which it can communicate; and the other one or ones of the at least two graphics processing units acting as a slave graphics processing unit or units to perform graphics processing operations under the control of the graphics processing unit that is acting as a master graphics processing unit.

11. The method of claim 10,
the method further comprising:
configuring the communications network of a graphics processing unit to disable the operation of the management unit of the graphics processing unit when the graphics processing unit is operating as a slave graphics processing unit.

12. The method of claim 10, comprising:
when a graphics processing unit is operating as a master graphics processing unit controlling other graphics processing units of the plurality of graphics processing units operating as slave graphics processing units;
the master graphics processing unit:
providing an interface with a host processor for the linked set of graphics processing units comprising the master graphics processing unit and its associated slave graphics processing units; and
partitioning any graphics processing task allocated to the linked set of graphics processing units into subtasks and distributing the subtasks for execution to execution units not only of the master graphics processing unit but also to execution units of the slave graphics processing unit or units that are linked to the master graphics processing unit.

13. The method of claim 10, wherein:
the graphics processing units each comprise a cache; and
the method further comprises:
when a graphics processing unit is operating in a stand-alone mode, in which the graphics processing unit operates independently of the other graphics processing units to perform a graphics processing task, storing all data to be cached for the graphics processing unit in the cache of that graphics processing unit; and
when two or more of the graphics processing units are operating as a linked set of a master and one or more slave graphics processing units, storing data to be cached for the set of two or more graphics processing units in different caches of the caches of the graphics processing units of the linked set of graphics processing units, in dependence on the memory addresses associated with the data.

14. The method of claim 10, wherein:
the graphics processing system comprises a host processor;
wherein:
the host processor is operable to execute applications that require graphics processing operations to be performed by the graphics processing system; and
the host processor executes one or more drivers that are operable to interface between applications executing on the host processor and the graphics processing units of the graphics processing system;
the method comprising:
the host processor configuring the communications networks of at least one of the graphics processing units of the plurality of graphics processing units to enable or disable communication between graphics processing units via a communications bridge or bridges;

the host processor communicating a graphics processing task to a graphics processing unit of the graphics processing system; and the graphics processing unit that receives the graphics processing task from the host processor, performing some or all of the graphics processing task.

15. The method of claim 14, comprising:
the host processor communicating a graphics processing task to a graphics processing unit of the graphics processing system; and
the graphics processing unit that receives the graphics processing task from the host processor performing all of the graphics processing task itself.

16. The method of claim 14, comprising:
the host processor communicating a graphics processing task to a graphics processing unit that is acting as a master graphics processing unit; and
that master graphics processing unit then distributing at least some of the processing for the graphics processing task to other slave graphics processing units of the graphics processing system that it is acting as a master graphics processing unit for.

17. The method of claim 14, comprising:
the host processor configuring communication bridges between the graphics processing units to enable or disable communication between graphics processing units, before communicating a graphics processing task to a graphics processing unit of the graphics processing system.

18. A method of operating a graphics processing system comprising a plurality of graphics processing units, in which:
each graphics processing unit of the plurality of graphics processing units is connected to at least one other graphics processing unit of the plurality of graphics processing units via a communications bridge or bridges that can allow communication between the connected graphics processing units:
each graphics processing unit of the plurality of graphics processing units comprises:
one or more execution units;
a management unit that provides an interface with a host processor for the graphics processing unit and is operable to partition a graphics processing task allocated to the graphics processing unit into subtasks and to distribute the subtasks for execution to an execution unit or units of the graphics processing unit;
and a communications network for providing communications between the units of the graphics processing unit, the communications network comprising a message-based interconnect using switches, and being configurable in use to control communications between the units of the graphics processing unit by configuring the switches in the communication network; and wherein:
the communications network is further configurable in use to either allow or prevent communication with at least one other graphics processing unit of the plurality of graphics processing units via a communications bridge or bridges by configuring the switches in the communications network;
the method comprising:
configuring the communications network of a graphics processing units of the plurality of graphics processing units to disable communication via a communications bridge or bridges between that graphics processing unit of the plurality of graphics processing units and the graphics processing unit or units to which it is connected via its communication bridges; and operating that graphics processing unit in a standalone mode, in which the graphics processing unit operates independently of the other graphics processing units to perform a graphics processing task.

19. A non-transitory computer readable storage medium storing computer software code which when executing on at least one processor performs a method of operating a graphics processing system comprising a plurality of graphics processing units, in which:

each graphics processing unit of the plurality of graphics processing units is connected to at least one other graphics processing unit of the plurality of graphics processing units via a communications bridge that can allow communication between the connected graphics processing units, and in which:

each graphics processing unit of the plurality of graphics processing units comprises:

one or more execution units;

a management unit that provides an interface with a host processor for the graphics processing unit and is operable to partition a graphics processing task allocated to the graphics processing unit into subtasks and to distribute the subtasks for execution to an execution unit or units of the graphics processing unit;

and a communications network for providing communications between the units of the graphics processing unit, the communications network comprising a message-based interconnect using switches, and being configurable in use to control communications between the units of the graphics processing unit by configuring the switches in the communication network; and wherein:

the communications network is further configurable in use to either allow or prevent communication with the at least one other graphics processing units via the communications bridge or bridges by configuring the switches in the communications network;

the method comprising:

enabling communication between at least two of the graphics processing units of the plurality of graphics processing units by configuring the communications networks of the at least two graphics processing units to allow communication between the at least two graphics processing units via a communications bridge or bridges of the graphics processing units;

and one of the graphics processing units of the at least two graphics processing units acting as a master graphics processing unit controlling graphics processing operations on the other one or ones of the at least two graphics processing units of the plurality of graphics processing units with which it can communicate; and the other one or ones of the at least two graphics processing units acting as a slave graphics processing unit or units to perform graphics processing operations under the control of the graphics processing unit that is acting as a master graphics processing unit.

* * * * *